March 12, 1968  E. D. McALISTER  3,373,281
METHOD FOR DETERMINING TOTAL HEAT FLOW FROM THE SEA SURFACE
BY MEANS OF DETECTING INFRARED RADIATION
IN TWO WAVELENGTH BANDS Filed April 21, 1965  3 Sheets-Sheet 1

INVENTOR.
EDWARD D. MCALISTER
BY
ATTORNEY.

March 12, 1968    E. D. McALISTER    3,373,281
METHOD FOR DETERMINING TOTAL HEAT FLOW FROM THE SEA SURFACE
BY MEANS OF DETECTING INFRARED RADIATION
IN TWO WAVELENGTH BANDS
Filed April 21, 1965    3 Sheets-Sheet 2

$I_w = I_\omega(1-r) + I_s r$

INVENTOR.
EDWARD D. MCALISTER
BY
ATTORNEY.

March 12, 1968 E. D. McALISTER 3,373,281
METHOD FOR DETERMINING TOTAL HEAT FLOW FROM THE SEA SURFACE
BY MEANS OF DETECTING INFRARED RADIATION
IN TWO WAVELENGTH BANDS
Filed April 21, 1965 3 Sheets-Sheet 3

INVENTOR.
EDWARD D. MCALISTER
BY
*Ervin F. Johnston*
ATTORNEY.

United States Patent Office 3,373,281
Patented Mar. 12, 1968

3,373,281
METHOD FOR DETERMINING TOTAL HEAT FLOW FROM THE SEA SURFACE BY MEANS OF DETECTING INFRARED RADIATION IN TWO WAVELENGTH BANDS
Edward D. McAlister, La Jolla, Calif., assignor, by mesne assignments, to the United States of America as represented by the Secretary of the Navy
Filed Apr. 21, 1965, Ser. No. 449,906
14 Claims. (Cl. 250—83.3)

ABSTRACT OF THE DISCLOSURE

The present invention is a method and device for enabling a determination of the total heat flow from the sea surface. This is accomplished by measuring the radiation from the top and bottom extremeties of an ocean layer where heat flow is substantially by water conduction only. This layer has been found to be approximately defined by the depths 0.1 mm. and 1.00 mm. It has been further found that the infrared radiation at the ocean depth .01 mm. is in the region of 3.5 to 4.0 microns of wavelength whereas the infrared radiation from the 1.00 mm. depth lies within the range of 2.0 to 2.4 microns of wavelength. The temperature corresponding to the indicated infrared readings may then be compared to indicate the temperature gradient and the corresponding total heat flow from the sea surface.

---

The invention described herein may be manufactured and used by or for the Government of the United States of America for governmental purposes without the payment of any royalties thereon or therefor.

The present invention relates to a method and a device for enabling a determination of the total heat flow from the sea surface by measurement at a shallow depth where the transfer is due to heat conduction from below.

The thermal status of the oceans is a major factor controlling weather. An ocean is analogous to a heat sink because of its absorption of heat from the sun during daytime and its release of this heat largely during the night. The world's oceans cover 71% of the earth's surface and they, in combination with the atmosphere above them, receive this same percentage of total energy coming from the sun or about $30 \times 10^{12}$ kilowatts of power on a daily basis. Of this total the ocean's surface (70N to 70S latitudes) receives about $20 \times 10^{12}$ kilowatts on a daily basis.

The loss of energy from the oceans is primarily by evaporation, re-radiation and air conduction. The loss of energy by evaporation is approximately $11 \times 10^{12}$ kilowatts and reradiation accounts for a loss of approximately $8 \times 10^{12}$ kilowatts on a daily basis. The remaining loss of $1 \times 10^{12}$ kilowatts is due primarily to air conduction at the sea-air interface. The heat of evaporation lost by the oceans is returned to the atmosphere by the heat of condensation released during cloud formation, thereby resulting in a general increase of air temperatures. The oceans, in receiving energy from the sun, the evaporation of the sea water and its later condensation into rain, the reradiation of heat to the atmosphere, and transport of heat by atmospheric and oceanic circulation all constitute, in a figurative sense, a heat engine which determines geographic climate (the mean or average condition) and weather (departures from the mean) on the earth.

Weather forecasting at present is done without direct knowledge of this heat flow from the world's oceans. Thus, we are operating in ignorance of the energy variations in time and geographic location which are basic to weather. Worldwide synoptic knowledge of this vast amount of energy released daily from the oceans would provide weather forecasters with this necessary factor. For instance, daily or weekly maps of the heat flow from each degree or two of latitude and longitude of the oceans analyzed over an extended period would provide data which could be utilized in long range weather forecasting. Synoptic data on this oceanwide basis could be supplied only from an earth orbital satellite as a platform. In this case, it would be necessary to use the microwave region in order to "see" through clouds and the total atmosphere since infrared radiation does not penetrate clouds.

Presently the energy flow from the sea surface has been obtained by calculations involving the observed percentage of cloud cover, water temperature, air temperature at the sea surface, humidity, wind velocity, and so forth. The collection of this data is time consuming and some of the data leaves doubts as to the reliability of the calculations because they are approximated or based upon a guess of an observer.

The present invention provides a method and a device for enabling a direct determination of the total heat flow from the sea surface, thereby obviating the necessity of obtaining all of the mentioned environmental data surrounding the sea location in question. The invention enables a determination of the total heat flow from the ocean surface by measuring the radiation from two different depths within a very thin water layer immediately below the surface. This layer is approximately one millimeter in depth and at night the transfer of heat therein will be primarily by conduction resulting in a substantially linear thermal gradient. From the measured radiations the temperatures at the two different depths can be determined and the total heat flow per second per unit area from the sea surface Q can be calculated from the following equation:

$$Q = k \frac{T_2 - T_1}{d_2 - d_1}$$

where $k$ is the coefficient of heat conductivity of the sea water and $T_1$ and $T_2$ represent the temperatures at the two different depths $d_1$ and $d_2$.

I have discovered that particular wavelengths or regions can be employed for measuring the radiation from the two different depths within the above described thin water layer. The wavelength regions may lie within the infrared spectrum or microwave wavelengths can be employed. For instance, in the infrared spectrum, a 3.5 to 4.0 micron wavelength region can be used for measuring the radiation from a depth of .06 mm. and a 2.0 to 2.4 micron wavelength region can be used for measuring the radiation from a depth of 0.5 mm. In the microwave spectrum an 8 mm. wavelength and a 3 cm. wavelength could be employed for measuring radiation from depths of 0.4 mm. and 1.0 mm., respectively. In some instances the microwave spectrum may be more desirable because of its capability of penetrating cloud coverage. Once the radiations from the two different depths are known the total heat flow from the sea surface can be calculated from the formula given above.

An object of the present invention is to provide a method and apparatus for enabling a direct determination of the total heat flow from a sea surface;

A further object of the present invention is to provide an apparatus for determining the radiations from upper and lower levels within a water layer within the sea where the transfer of heat is substantially by conduction only;

Still another object is to provide an apparatus for enabling a determination of the temperatures at upper and lower levels within a water layer within the sea where the transfer of heat is substantially by conduction only;

Other objects, advantages and novel features of the invention will become apparent from the following detailed description of the invention when considered in conjunction with the accompanying drawings wherein.

Figure 1:
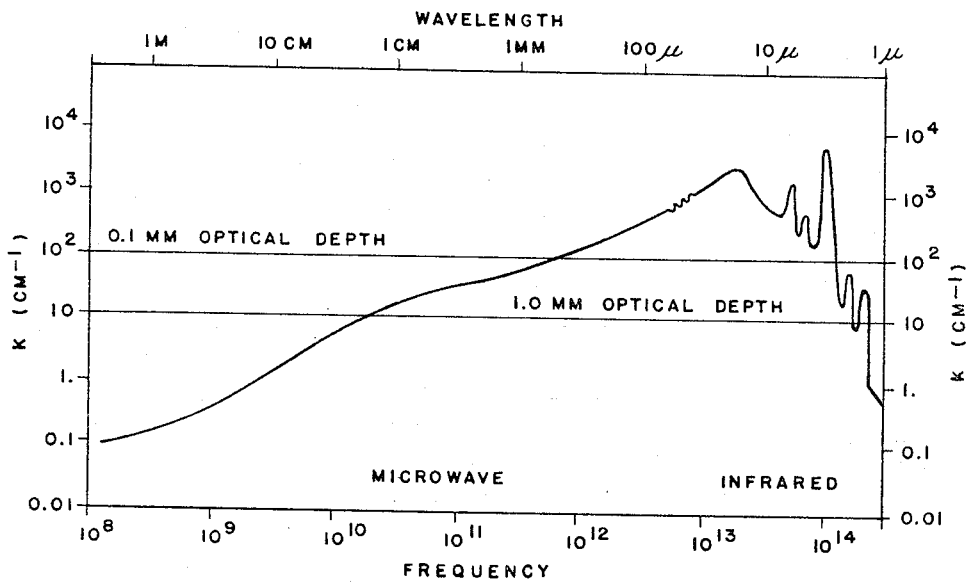
FIG. 1 shows the reciprocal of the absorption coefficient (or optical depth) of water as a function of wavelength within the infrared and microwave spectrum.

Referring now to the drawings, there is shown in FIG. 1 the absorption coefficient ($k$) of sea water versus wavelength. It has been found that the reciprocal of the absorption coefficient ($k$) is equal to the optical depth so that $1/k$ can also be used as the optical depth of the water. Two representative depths, .1 mm. and 1.0 mm., are shown in FIG. 1. Both of these depths are within the water layer where heat transfer is substantially by conduction only. As shown in FIG. 1, the radiation from these depths can be measured at selected frequencies within either the infrared or microwave frequency spectrum. Within the microwave spectrum these wavelengths would be something less than 1 cm. and 3 cm. for the depths .4 mm. and 1.0 mm., respectively.

Figure 2:
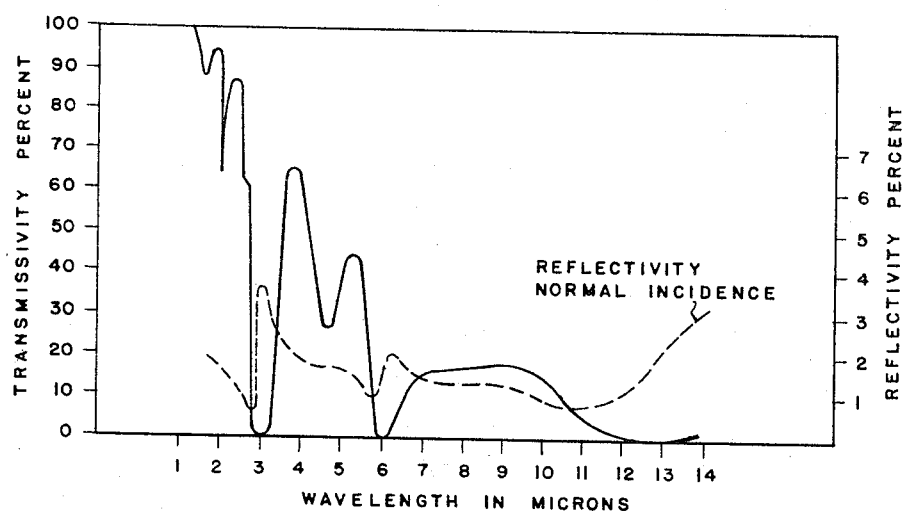
FIG. 2 shows the transmissivity of 0.003 cm. of water and reflectivity of a free water surface at different wavelengths within the infrared spectrum.

FIG. 2 shows the transmission of a 0.030 mm. layer of water and the reflection of radiation at normal incidence for the same wavelength region. It can be seen from this figure that transmissivity is reasonably high, but different for infrared wavelength regions falling between 2.0 to 2.4 microns and 3.5 to 4.0 microns.

Figure 3:
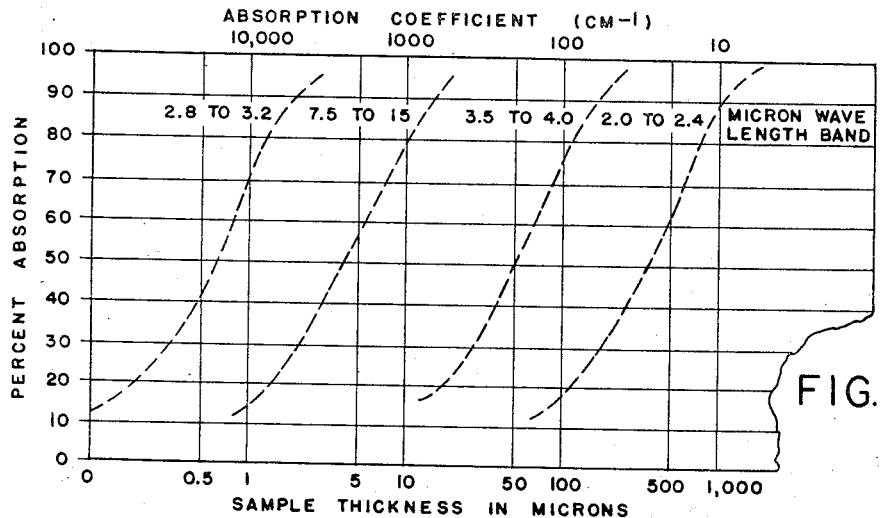
FIG. 3 shows the absorption of radiation by water for selected wavelength regions within the infrared spectrum.

FIG. 3 shows the absorption of radiation by water for various selected infrared wavelength regions as a function of water thickness in microns. It can be seen from this figure that the infrared radiation from depths of 0.06 mm. and 0.5 mm. can be measured by isolating the infrared spectrums of 3.5 to 4.0 microns and 2.0 to 2.4 microns, respectively. These infrared regions are satisfactory for nighttime measurements, however they would not be practical for daytime measurements because the reflected solar radiation would be greater than the emission from the water surface. An 8 to 14 micron region however could be used in daytime.

Figure 4:
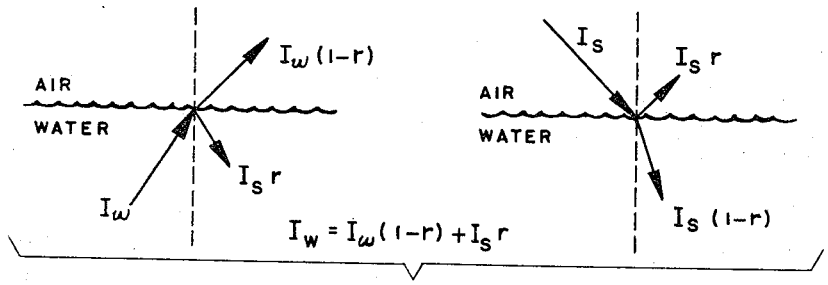
FIG. 4 shows the components which make up the heat radiation from a water surface due to water emission and sky reflection.

In taking measurements of the radiation from the water surface at night it is normally necessary to take into consideration the reflected sky radiation. When a radiometer is taking a radiation measurement at a particular depth within the ocean the measured value includes radiance from below the surface as well as radiance due to sky reflection. As can be seen from FIG. 4, the measured radiance $I_W$ is the sum of two parts, namely: $I_W(1-r)$ from below the surface and $I_S r$ from the sky reflection from the water surface. Accordingly, the formula for the measured radiance at a particular depth is:

$$IW = I_W(1-r) + I_S r \quad (1)$$

where $r$ equals the reflectivity of the water.

If desired the measured radiance from a particular depth in the sea can be compared with a calibrated reference black body of a known temperature $T_B$ to convert the radiation measurement to a temperature reading. A calibration record can be provided for this reference black body having a known radiation $I_{B_1}$ and a known temperature $T_{B_1}$. Accordingly, by this comparison a calibration constant $C$ in intensity units per °C. temperature difference can be provided. The formula for the calibration constant $C$ would then be as follows:

$$C = \frac{I_B - I_{B_1}}{T_B - T_{B_1}}$$

Having known the calibration constant the radiance reading at the particular depth can be compared with the radiation $I_B$ of the reference black body in order to determine the temperature at that depth. This comparison may be represented by the following formula:

$$(I_B - I_W) = I_B - I_w(1-r) - I_S r \quad (3)$$

which reduces to $$(I_B - I_W) = (I_B - I_w)e + (I_B - I_S)r \quad (4)$$

where the emissivity $e$ of the water is represented by $e = (1-r)$. By transposing and substituting values in the calibration constant formula hereinabove it can be found that $$(I_B - I_w) = C(T_B - T_w) \quad (5)$$

and substituting $C(T_B - T_w)$ for $(I_B - I_w)$ in Formula 4 the equation for determining the temperature $T_w$ becomes $$T_w = T_B - \frac{(I_B - I_W) - (I_B - I_S)r}{eC} \quad (6)$$

Figure 5:
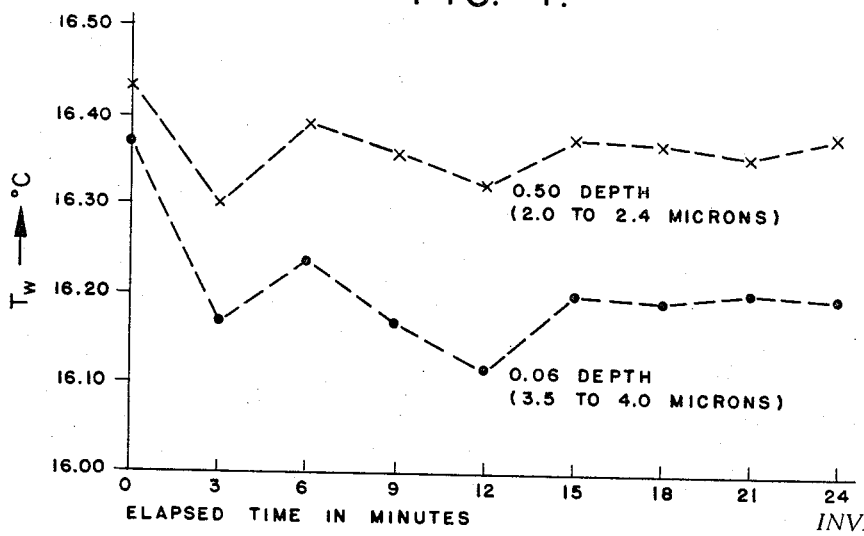
FIG. 5 shows an example tabulation of temperatures at two different depths within the predetermined water layer using the present invention.

By taking radiance measurements at two different depths within the predetermined water layer between 0.1 mm. and 1.0 mm., Formula 6 can be used to determine the temperature at each of these depths. FIG. 5 is an example of calculated temperature readings at water depths of 0.06 mm. and 0.50 mm. using infrared wavelength regions of 3.5 to 4.0 microns and 2.0 to 2.4 microns, respectively. For the infrared wavelength region 2.0 to 2.4 microns the reflectivity of the water was 0.016 and the emissivity of the water was 0.984. For the infrared wavelength region 3.5 to 4.0 microns the reflectivity of the water was 0.022 and the emissivity of the water was 0.978.

From the temperature difference between the two depths shown in FIG. 5 the total heat flow by conduction $Q$ in cal cm.$^{-2}$ sec.$^{-1}$ can be calculated by the following formula:

$$Q = k \frac{T_2 - T_1}{d_2 - d_1}$$

where $k$ equals the coefficient of heat conductivity of sea water, and $T_1$ and $T_2$ are the temperatures at the two different depths $d_1$ and $d_2$. This calculated heat flow by conduction from the sea is an indication of the heat sink properties of the sea and can be used as a factor in making weather predictions.

In conformance with the above stated principles I have come up with a method for enabling the determination of the total heat flow from a sea surface. This may be accomplished by measuring the radiation from a first predetermined depth below the sea-air interface and measuring the radiation from a second predetermined depth which is below the first depth wherein the first and second predetermined depths define a water layer where the heat flow is substantially by conduction only. The method may include comparing the measured radiances with a calibrated radiation reference source so that the measured radiations can be converted to temperature. A two-wavelength radiometer, which will be described hereinafter, may be employed for taking these radiation readings at the top and bottom of the predetermined water layer. If the infrared spectrum is used, wavelength regions of 3.5 to 4.0 microns and 2.0 to 2.4 microns may be employed. By separately measuring sky radiation the previous radiation readings can be corrected for sky reflection from the water surface.

Figure 6:
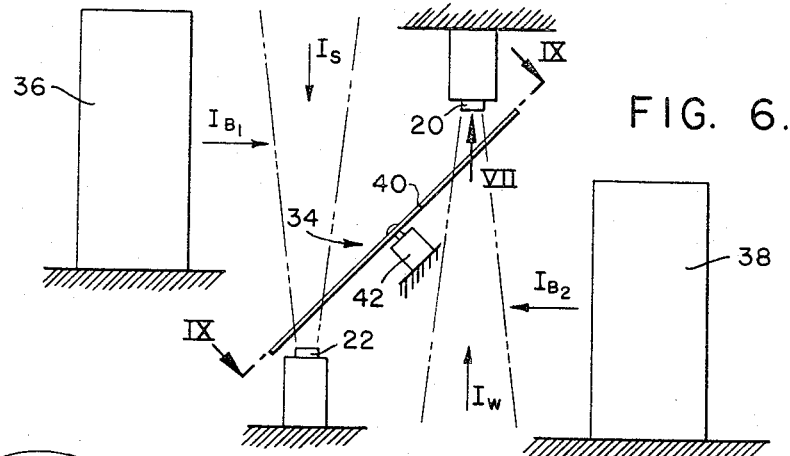
FIG. 6 shows a schematic arrangement of a two-wavelength radiometer for enabling a determination of the total heat flow from the sea surface.
Figure 8:
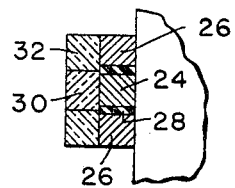
FIG. 8 is a view taken along plane VIII—VIII of FIG. 7.

FIG. 6 shows an exemplary schematic illustration of an apparatus for enabling a determination of the total heat flow from the sea. As shown, a detector means 20 may be positioned to look downwardly at the sea surface for the detection of radiation therefrom and an identical detector means 22 may be positioned to look upwardly at the sky to determine the radiation therefrom. As shown in FIG. 8, the detector means 20 may include a pair of detectors with an inner detector 24 being electrically insulated from an outer detector 26 by an insulative ring 28. These detectors may be constructed of a material such as PbS.

Figure 7:
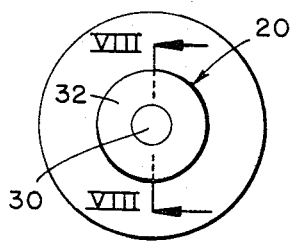
FIG. 7 is a view looking in the direction of the arrow VII of FIG. 6.

As shown in FIGS. 7 and 8, the detector means 20 may further include a pair of concentric filters 30 and 32 being mounted adjacent to and within the optical paths of the detectors 24 and 26, respectively, so as to isolate the radiation to the detectors within the predetermined wavelengths. If the infrared spectrum is used the filters 30 and 32 may isolate the 2.0 to 2.4 micron and 3.5 to 4.0 micron regions, respectively. If the microwave spectrum is used electronic band pass type filters may be employed to isolate the frequencies corresponding to a 3 cm. and an 8 mm. wavelength, respectively.

Figure 9:
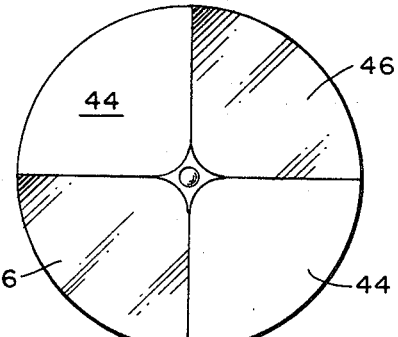
FIG. 9 is a view taken along plane IX—IX of FIG. 6.

Interposed within the optical path of each detector means 20 and 22 is a chopper means 34 for allowing each detector means 20 and 22 to alternatively look at the unknown environment and a reference radiation source. With respect to the detector means 20, it will alternatively look at the sea surface and a reference radiation source means 36 and with respect to the detector means 22, it will look alternatively at the sky and a reference radiation source means 38. As shown in FIGS. 6 and 9, the chopper means may include a circular wheel 40 which is centrally mounted to a motor 42. The wheel 40 may be divided into quadrants with alternated transparent or open portions 44 and reflective portions 46, the reflective portions 46 being silvered or mirrored on both sides of the wheel.

It is desirable that the radiation reference source means 36 be at a temperature different than the radiation source means 38 for calibration purposes. A one degree centigrade increase in the temperature of the source means 38 over the source means 36 has been found to be satisfactory. The radiation source means 36 and 38 can then be calibrated by moving a secondary mirror into the optical path of each detector means 20 and 22 so that each detector means can alternatively view the two radiation reference source means 36 and 38. In this manner a calibration constant C can be determined according to Formula 2 set forth above. It is desirable that the radiation reference source means 36 be at a temperature approximately that of the sea so that the calibration constant C will remain substantially constant for small temperature differences.

The apparatus shown in FIG. 6 may be mounted on the tip of a wing of an aircraft for taking measurements of the radiation from the sea and the sky. The detector means 20 will measure the radiation at two different depths within the sea as well as the radiation from reference source means 36 so that the temperatures at each of these depths can be calculated according to Formula 6. The sky reflection correction measurements can be taken by the detector means 22 which will measure the radiation from the sky as well as the radiation from the reference source means 38. If the apparatus, shown in FIG. 6, is mounted in a satellite the sky radiation measuring detector means 22 and reference source means 38 would not be necessary since the detector means 20 would not include in their measurement any radiation due to sky reflection.

Figure 10:
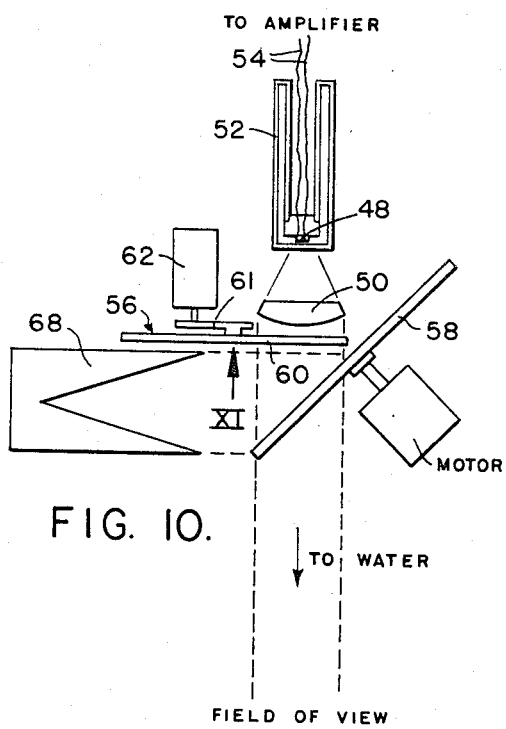
FIG. 10 is another schematic illustration of another apparatus for accomplishing substantially the same results obtainable from the apparatus shown in FIG. 6.
Figure 11:
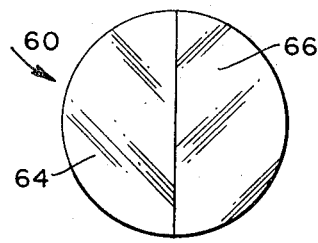
FIG. 11 is a view looking in the direction of the arrow XI of FIG. 10.

FIG. 10 illustrates still another apparatus which may be employed for measuring the radiation from two different depths within the sea. As shown, a single detector 48 may be positioned to look downwardly at the sea surface and its field of view may be confined by a lens 50. The detector 48 may be constructed of PbS and may be mounted in a Dewar type flask 52 for cooling purposes. The output of the detector 48 may be fed to an amplifier and recorder (not shown) via a pair of leads 54. Interposed within the optical path of the detector 48 is a filter means 56 and a chopper means 58. The filter means 56 may include a filter wheel 60 which is mounted by a Geneva drive 61 to a motor 62. As shown in FIG. 11, the filter wheel 60 may be divided in half into alternating filters 64 and 66. The filter 64 would isolate one wavelength or region and the filter 66 would isolate another wavelength or region in conformance with the principles described hereinabove. The Geneva drive causes each filter (64 or 66) to pause in the optical path of the detector 48 for a period of time.

The chopper means 58 causes the detector 48 to alternatively view the sea and a radiation reference source means 68. The apparatus is then pointed upwards and views the sky. The chopper means 58 may be similar to the chopper means 34 shown in FIG. 6. The apparatus shown in FIG. 10 may be operated on an A.C. basis with the chopper means 58 rotating at a considerably faster rate than the filter wheel 60. For instance, the chopper means may rotate at 88 c.p.s. while the filter wheel is rotated at 1 cycle per minute. In this manner synchronization between the chopper means and the filter wheel will not be necessary.

The radiation reference source means 68 may be compared for calibration purposes with an external radiation reference source means of a known temperature and radiation so that a calibration constant C can be determined in accordance with the principles described hereinabove. The measurements of radiation from the sea and from the sky by the detector 48 can then be used to determine the temperature of the water at the depths involved according to Formula 6.

It is now readily apparent that the present invention provides a method and apparatus for enabling a direct determination of the total heat flow from a sea surface. This direct determination provides improved accuracy and is much simpler to obtain than methods used heretofore.

Obviously many modifications and variations of the present invention are possible in the light of the above teachings. It is to be understood that within the scope of the appended claims the invention may be practiced otherwise than as specifically described.

I claim:
1. A method of enabling the determination of the total heat flow radiated from the sea surface comprising the steps of:
   measuring the radiance from a first predetermined depth below the sea-air interface;
   measuring the radiance from a second predetermined depth which is at a lower level than the first depth; and
   said predetermined depths being within a layer of water where the heat flow is substantially by water conduction only.
2. A method as claimed in claim 1 wherein:
   said layer of water is defined by depths of .01 mm. and 1.00 mm.
3. A method as claimed in claim 1 wherein:
   the radiance from said first predetermined depth lies within an infrared region of 3.5–4.0 microns in wavelength; and
   the radiance from said second predetermined depth lies within an infrared region of 2.0–2.4 microns in wavelength.

4. A method as claimed in claim 1 wherein:
the radiance from said first predetermined depth is approximately 8 mm. in wavelength; and
the radiance from said second predetermined depth is approximately 3 cm. in wavelength.

5. A method of enabling the determination of the total heat flow radiated from a sea surface comprising the steps of:
measuring the radiation within a predetermined infrared region which is radiated from a first depth below the sea-air interface;
measuring the radiation within the same infrared region from the sky so that the two radiations can be compared and converted to a temperature corresponding to said first depth;
measuring the radiation within another predetermined infrared region which is radiated from a second depth below said first depth;
measuring the radiation within the other infrared region from the sky so that the latter two radiations can be compared and converted to a temperature corresponding to said second depth; and
said depths being within a water layer where the heat flow is substantially by conduction only,
whereby the temperatures at said first and second depths can be used to determine the total heat flow radiated from the sea.

6. A method as claimed in claim 5 wherein:
said water layer is defined by depths of approximately 0.1 mm. and 1.00 mm.

7. A method as claimed in claim 5 wherein:
said first and second depths are approximately .06 mm. and .50 mm. respectively.

8. A method as claimed in claim 7 wherein:
the first mentioned infrared region is from 3.5 to 4.0 microns; and
the second mentioned infrared region is from 2.0 to 2.4 microns.

9. An apparatus for enabling the determination of the total heat flow radiated from a sea surface comprising:
infrared detection means;
filter means for isolating the radiation to the detection means within a pair of infrared wavelength bands wherein each band corresponds to a respective predetermined depth below the sea-air surface; and
the predetermined depths being within a water layer where the heat flow is substantially by conduction only.

10. An apparatus as claimed in claim 9 wherein:
said pair of infrared wavelength bands are 3.5 to 4.0 microns and 2.0 to 2.4 microns.

11. An apparatus for enabling the determination of the heat flow radiated from a sea surface comprising:
two pairs of infrared detectors wherein one pair is capable of detecting infrared from the sea and the other pair is capable of detecting infrared from the sky;
filter means within the optical path of each pair of detectors for isolating the infrared radiation to each detector of a pair to a respective wavelength band, each band isolating radiation from a respective predetermined depth below the sea-air surface; and
the predetermined depths being within a water layer where the heat flow is substantially by conduction only.

12. An apparatus as claimed in claim 11 including:
a pair of infrared reference source means with each means corresponding to a respective infrared detector; and
means within the optical path of each detector for alternatively chopping the radiation from the sea and the sky and reflecting the infrared from each infrared reference source means to the respective detector.

13. An apparatus as claimed in claim 12 wherein:
the temperature of the infrared reference source means, corresponding to the sea infrared detector, is set at approximately sea temperature; and
the temperature of the infrared reference source means, corresponding to the sky infrared deterctor, is set at approximately 1° C. above sea temperature.

14. An apparatus for enabling the determination of the heat flow radiated from a sea surface comprising:
two pairs of infrared detectors wherein one pair is capable of detecting infrared from the sea and the other pair is capable of detecting infrared from the sky;
filter means within the optical path of each pair of detectors for isolating the infrared radiation to each detector of a pair to a respective wavelength band, each band isolating radiation from a respective predetermined depth below the sea-air interface;
the infrared wavelength bands being 3.5 to 4.0 microns and 2.0 to 2.4 microns;
a pair of infrared reference source means with each means corresponding to a respective infrared detector;
means within the optical path of each detector for alternatively chopping the radiation from the sea and the sky and reflecting the infrared from each infrared reference source means to the respective detector;
the temperature of the infrared reference source means, corresponding to the sea infrared detector, being set at approximately sea temperature; and
the temperature of the infrered reference source means, corresponding to the sky infrared detector, being set at approximately 1° C. above sea temperature.

References Cited

UNITED STATES PATENTS

| | | | |
|---|---|---|---|
| 2,412,165 | 12/1946 | McDermott | 250—83.3 |
| 3,056,958 | 10/1962 | Anderson | 250—83.3 X |
| 3,278,746 | 10/1966 | Fiat | 250—83.3 |

OTHER REFERENCES

The Measurement of Thermal Radiation at Microwave Frequencies, by R. H. Dicke, from Review of Scientific Instruments, vol. 17, No. 7, July 1946, pp. 268–275.

ARCHIE R. BORCHELT, *Primary Examiner.*